United States Patent [19]

Dublin, Jr. et al.

[11] 4,414,846
[45] Nov. 15, 1983

[54] GAS WELL MONITORING DEVICE

[75] Inventors: Wilbur L. Dublin, Jr., Round Rock, Tex.; Jack Schrenkel, 3709 S. Atlanta, Tulsa, Okla. 74105

[73] Assignee: Jack Schrenkel, Tulsa, Okla. ; a part interest

[21] Appl. No.: 347,342

[22] Filed: Feb. 9, 1982

[51] Int. Cl.³ .............................................. E21B 47/06
[52] U.S. Cl. .................... 73/151; 73/432 SD
[58] Field of Search .......... 73/151, 700, 714, 432 SD; 364/422, 804

[56] References Cited

U.S. PATENT DOCUMENTS

| | | | |
|---|---|---|---|
| 3,874,231 | 4/1975 | Walther, Jr. | 73/151 |
| 4,267,726 | 5/1981 | Noik | 73/151 |
| 4,304,122 | 12/1981 | Tentor | 73/432 SD X |
| 4,355,365 | 10/1982 | McCracken et al. | 364/422 X |

*Primary Examiner*—Jerry W. Myracle
*Attorney, Agent, or Firm*—Richards, Harris & Medlock

[57] ABSTRACT

A gas well monitoring device (10) for installation at a well head (26) for determining bottom hole pressure of a well bore is provided. The monitoring device (10) includes a sensing unit (24) disposed at the well head. The sensing unit (24) includes a pressure transducer (60) and a temperature transducer (42) for measuring pressure and temperature of the gas at the well head. Automatic control circuitry (76, 78, 82) periodically sample the output of the transducers (42, 60). A processor (82) is interconnected to the automatic control circuitry (76, 78) for calculating the value of bottom hole pressure based upon the output of the transducers (42, 60). Storage circuitry (86, 88) is interconnected to the processor (82) for receiving and storing at predetermined time intervals related values of the sampled well head pressure and well head temperature, and the calculated value of bottom hole pressure at the predetermined time intervals. A display (14, 15, 96) is provided for displaying well data stored in the storage circuitry (86).

5 Claims, 3 Drawing Figures

GAS WELL MONITORING DEVICE

TECHNICAL FIELD

This invention relates to monitoring devices, and more particularly to a gas well monitoring device for determining bottom hole pressure of a well bore.

BACKGROUND ART

In the gas industry, it is highly desirable in many instances that the pressure in well bores penetrating subterranean formations be determinable quickly and accurately. For instance, it is possible to determine certain parameters of the formation such as the permeability, and the like by measurement of pressure changes as a function of time. In some instances, it is desirable to know the pressure in a well bore in order that the migration of gases into lower pressure formations may be avoided or controlled. As a result, several devices have been proposed for measuring the pressure in subterranean formations penetrated by a well bore.

Previously developed systems have utilized monitoring devices in which the device is lowered into the well bore using a cable or string. Such devices are described in U.S. Pat. No. 3,874,231 issued to Walther, Jr., on Apr. 1, 1975 and entitled "Diffusion Bearer Chamber For Sperry Sun Permagage Type Pressure Gauge" and U.S. Pat. No. 4,267,726 issued to Noik on May 19, 1981 and entitled "Well Pressure Testing Method".

Such previously developed gas well monitoring devices have suffered from the physical consequences of measuring such pressure in the well bore itself. For example, due to the corrosive nature of the elements present in the well bore, such monitoring devices suffer structural degradation and failure in use. Such devices when present within the well bore undergo substantial movement and friction such that the device may sever from the cable and be lost in the well. Additionally, where the well bore is not substantially vertical, but irregularly shaped or curved, such monitoring devices may be difficult to remove from the well.

A need has thus arisen for an improved gas well monitoring device for computing bottom hole pressure of a well bore having improved reliability and accuracy. A need has further arisen for a gas well monitoring device which eliminates the difficulties in using such previously developed devices which are lowered into the well bore. Furthermore, a need has arisen for a gas well monitoring device which automatically and periodically samples bottom hole pressures for subsequent display or storage.

DISCLOSURE OF THE INVENTION

In accordance with the present invention, a gas well monitoring device is provided for substantially eliminating the problems heretofore associated with gas well monitoring devices for measuring bottom hole pressure of a well bore.

In accordance with the present invention, a gas well monitoring device is provided for installation at a well head for the determination of bottom hole pressure in a well bore. The monitoring device includes a sensing unit disposed at the well head and which includes a pressure transducer and temperature transducer. The transducers are exposed to the atmosphere of the gas in the well head to thereby measure pressure and temperature of the gas at the well head. An automatic control device is provided for periodically sampling the output of the transducers. A processor is interconnected to the automatic control device for calculating the value of bottom hole pressure based upon the output of the transducers. Storage devices are provided for receiving and storing at predetermined timed intervals the value of the sampled well head pressure, well head temperature and the calculated value of the bottom hole pressure at the predetermined time intervals. The gas well monitoring device further includes a display for displaying well data stored in the storage devices.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 3 is an electrical block diagram of the components of the present gas well monitoring device.

DETAILED DESCRIPTION

Figure 1:
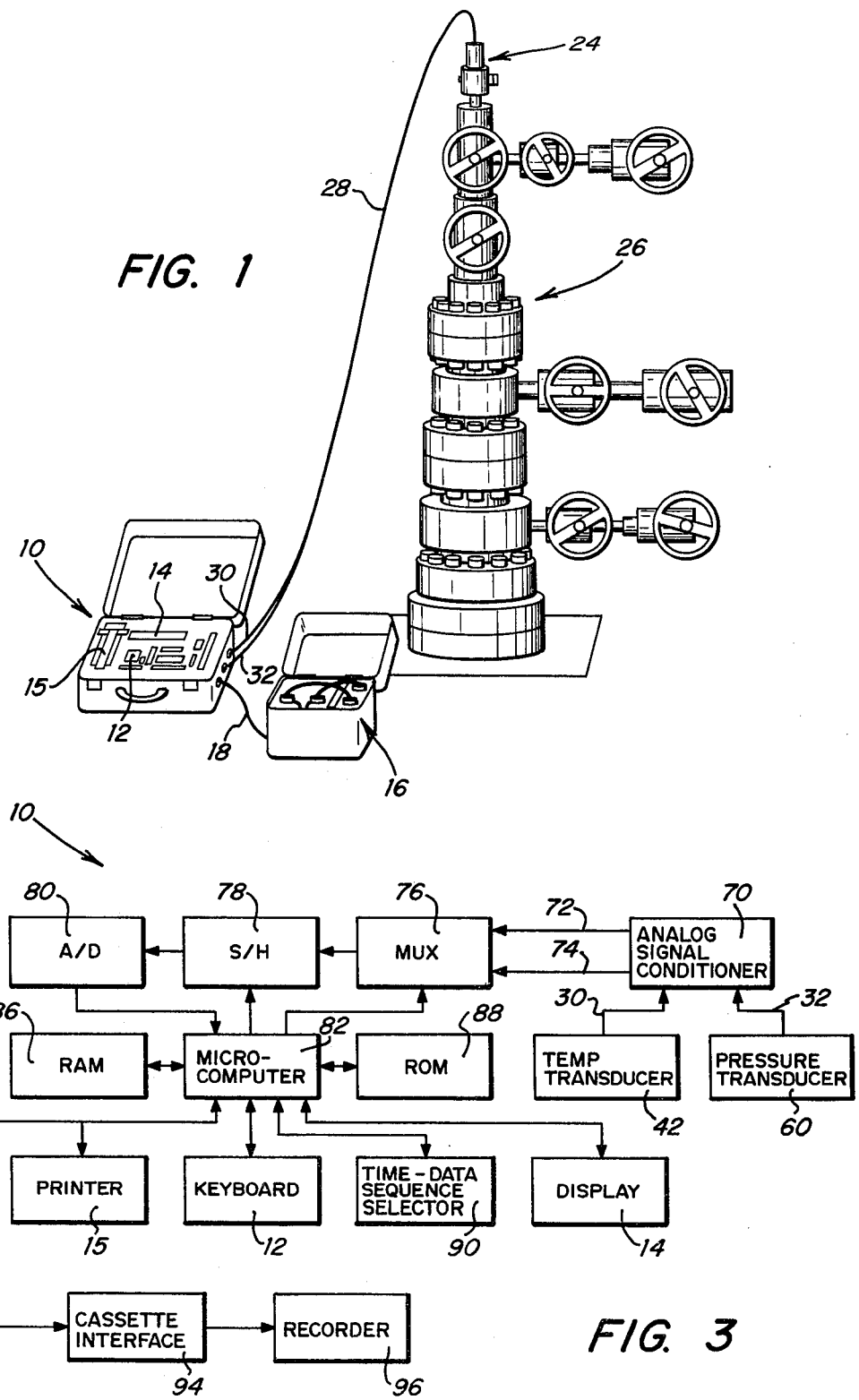
FIG. 1 is an illustration of a gas well head utilizing the present gas well monitoring device.

FIG. 1 illustrates the present gas well monitoring device, generally identified by the numeral 10. Gas well monitoring device 10 includes a keyboard 12 for the input of well parameter data and time parameters which determine the rate at which bottom hole pressure is calculated. Gas well monitoring device 10 further includes a display 14 and printer 15 for displaying to an operator well parameter data as well as the calculated bottom hole pressure at the selected time intervals. Interconnected to gas well monitoring device 10 is a battery supply 16 via cable 18.

Gas well monitoring device 10 is interconnected through a transducer coupler 24 to the well head "christmas tree", generally identified by the numeral 26. Transducer coupler 24 houses pressure and temperature transducers which are exposed to the atmosphere of the gas within the well head for measuring pressure and temperature of the gas at the well head of a well. Christmas tree 26 includes the typical gauges, valves and hardware associated with the well head of a well bore. Transducer coupler 24 is interconnected to gas well monitoring device 10 via cable 28.

An important aspect of the present invention is that pressure and temperature of the gas contained within a well bore is measured by the present gas well monitoring device 10 using transducers which are disposed at the well head rather than previously developed monitoring devices wherein these parameters are measured within the well bore.

Figure 2:
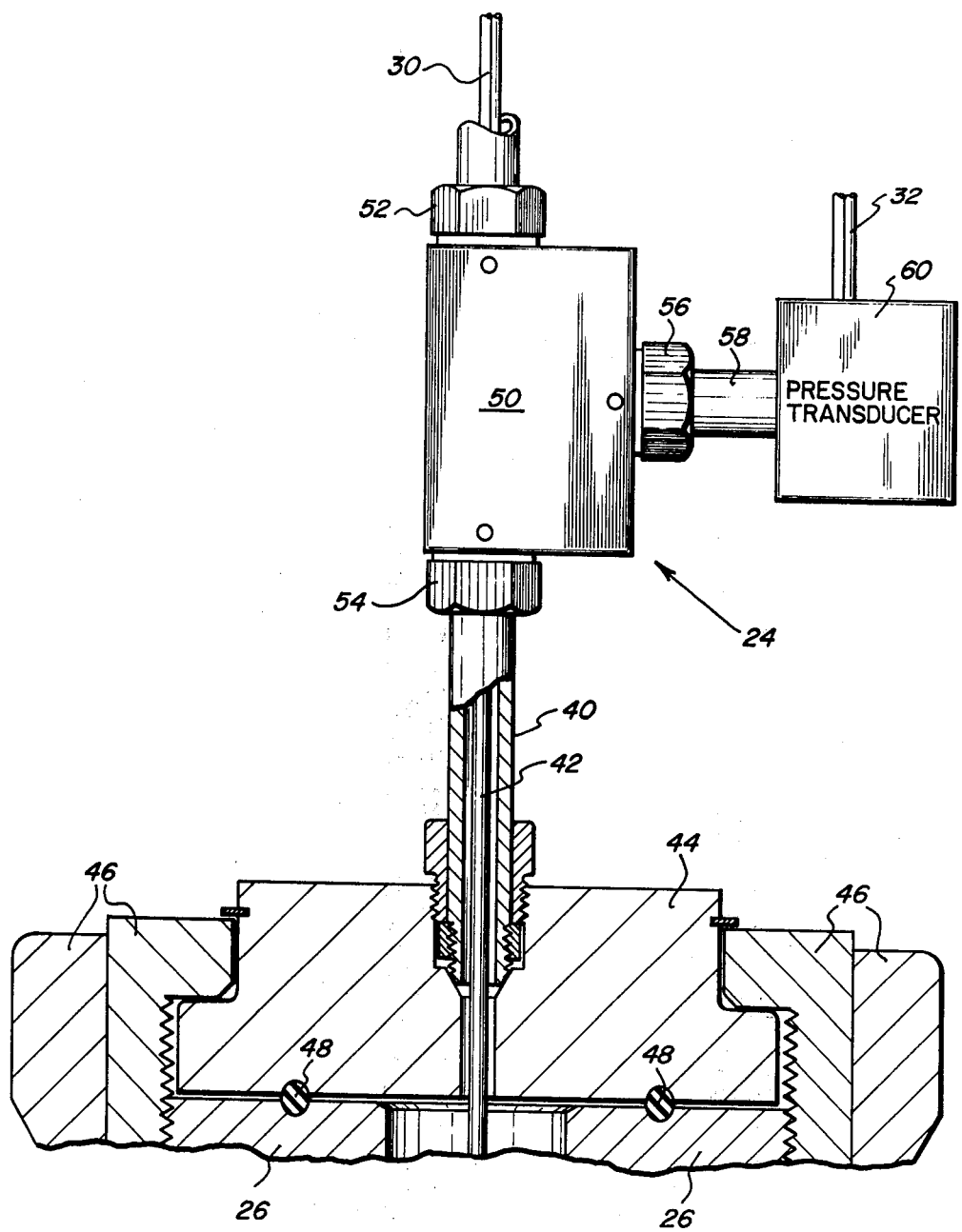
FIG. 2 is an illustration of hardware interconnecting transducers utilized with the present monitoring device to the well head.

FIG. 2 illustrates a typical hardware installation for mounting the temperature transducer and pressure transducer at the well head. Transducer coupler 24 includes tubing 40 for housing a temperature transducer 42. Temperature transducer 42 extends through a cap 44 into christmas tree 26. Cap 44 is interconnected to christmas tree 26 using a nut 46. A seal ring 48 is disposed between cap 44 and christmas tree 26. Interconnected to tubing 40 is a pressure transducer sensor element 50 which is disposed between fitting 52 and 54 with a pressure seal at fitting 52. Pressure transducer sensor element 50 is interconnected via a fitting 56, and tubing 58 to pressure transducer 60.

Cable 30 is interconnected to temperature transducer 42. Cable 32 is interconnected to pressure transducer 60. Cable 28 houses cables 30 and 32 for interconnecting transducers 42 and 60 to gas well monitoring device 10 (FIG. 1).

Temperature transducer 42 may comprise, for example, a sheath-type thermocouple manufactured by Autoclave Engineers, Erie, Pa. The transducer coupler 24 hardware is manufactured and sold by Autoclave Engineers. Pressure transducer 60 may comprise a strain gauge pressure transducer. Temperature transducer 42 may comprise, for example, a nickel resistance temperature sensor which is linearized and standardized for the same type signal conditioner as for pressure transducer 60.

FIG. 3 illustrates a block diagram of the component electronic circuitry of the present gas well monitoring device. Inputs from pressure transducer 60 and temperature transducer 42 are applied via cables 32 and 30 to an analog signal conditioner 70. Analog signal conditioner 70 functions to provide excitation for transducers 42 and 60 and standardize the various inputs from transducers 42 and 60. The output of analog signal conditioner 70 is applied via signal lines 72 and 74 to a multiplexer 76. Multiplexer 76 switches the individual transducer outputs to a sample and hold module 78 and an analog-to-digital converter 80 for successive conversions and measurements.

A microcomputer 82 is interconnected to multiplexer 76, sample and hole module 78 and analog-to-digital converter 80. Microcomputer 82 controls the operation of multiplexer 76 to switch between the individual transducer outputs and controls sample and hold module 78 to provide the required pressure or temperature information to analog-to-digital converter 80. Analog-to-digital converter 80 converts the analog signals from transducers 42 and 60 to digital data words for input to microcomputer 82.

Microcomputer 82 contains a clock, timer, an input/output controller and a central processing unit. Microcomputer 82 performs the necessary operations to calculate bottom hole pressure based upon input data supplied by transducers 42 and 60 as well as data input to microcomputer 82 via keyboard 12. Microcomputer 82 is programmed to perform the calculation for bottom hole pressure according to the methods outlined in the *Manual of Back-Pressure Testing of Gas Wells*, Interstate Oil Compact Commission, Oklahoma City, Okla. (copyright 1976).

Interconnected to microcomputer 82 is a random access memory 86 which contains input constants and receives variables from analog-to-digital converter 80 and which further provides scratch pad storage facility. Also interconnected to microcomputer 82 is a read only memory 88 which functions to contain the software program for controlling the functions of data acquisition and the algorithm for computation of the bottom hole pressure equations. Microcomputer 82 and the software contained within read only memory 88 also corrects for transducer nonlinearity.

Further interconnected to microcomputer 82 is keyboard 12. Data input through keyboard 12 includes the following input constraints:
1. Well Identification
2. Date
3. Time
4. Depth from Surface of end of string 1, in feet.
5. Length of string 1, in feet
6. Friction factor for string 1
7. Depth from end of string 1 to end of string 2, in feet
8. Length of string 2 in feet
9. Friction factor for string 2
10. Bottom hole temperature in degrees Fahrenheit
11. Flow rate in millions of cubic feet per day
12. Volume fraction of carbon dioxide in produced gas
13. Volume fraction of nitrogen in produced gas
14. Volume fraction of hydrogen sulphide in produced gas
15. Specific gravity of produced gas
16. Sensitivity factor for temperature sensor
17. Sensitivity factor for pressure sensor Microcomputer 82 performs the required calculations based upon the input data supplied by keyboard 12 at the time intervals preselected through time data sequence selector 90. Input through time data sequence selector 90 controls the periodic sampling of transducers 42 and 60 as well as the related calculations performed by microcomputer 82 of bottom hole pressure. Any desire of sampling rates may be selected through time data sequence selector 90 for example, the following sequences may be utilized:
- 230 data points, 1 minute apart.
- 230 data points, 5 minutes apart.
- 230 data points, 10 minutes apart.
- 230 data points, 15 minutes apart.
- 230 data points, 30 minutes apart.
- 168 data points, 1 hour apart.
- 42 data points, 4 hours apart.

A sequence of
- 10 data points, 6 minutes apart;
- 10 data points, 12 minutes apart;
- 10 data points, 24 minutes apart; and
- 10 data points, 48 minutes apart.

A sequence of
- 48 data points, 0.25 hours apart;
- 24 data points, 1 hour apart; and
- 61 data points, 2 hours apart.

A sequence of
- 8 data points, 0.25 hours apart;
- 20 data points, 0.5 hours apart; and
- 156 data points, 1 hour apart.

Also interconnected to microcomputer 82 is display 14 (FIG. 1) which may comprise, for example, a light-emitting-diode or liquid crystal display. Additionally interconnected to microcomputer 82 is a printer 15 for recording the input constraints and data calculated by gas well monitoring device 10. The output of printer 92 is illustrated in Table 1.

TABLE 1

```
READINGS FOR
WELL ID#8898
   DATE: 1/02
   TIME 14:43
CONSTANTS:
STRING 1 :
  DEPTH
     1.049E 4
  LENGTH
     1.049E 4
  FRICTION
     1.048E-2
STRING 2
  DEPTH
     1.630E 2
```

```
LENGTH
    1.680E+2
FRICTION
    1.777E-2
BOT.HOLE TMP
    1.700E 2
FLOW RATE
    1.144E 1
IMPURITIES
CO2 2.499E-2
N2  0.000
H2S 0.000
SPEC GRAV
    6.149E-1
DEG/COUNT
    4.394E-2
PSI/COUNT
    2.441
DATA START
    TIME 14:37
*** DATA ***
PRS 3.253E 3
TMP 7.032E 1
BHP 6.641E 3
    TIME 14:38
PRS 4.803E 3
TMP 6.940E 1
BHP 6.152E 3
    TIME 14:39
PRS 4.648E 3
TMP 6.896E 1
BHP 5.972E 3
    TIME 14:40
PRS 4.534E 3
TMP 6.852E 1
BHP 5.879E 3
    TIME 14:41
PRS 4.474E 3
TMP 6.808E 1
BHP 5.791E 3
    TIME 14:42
```

The output of microcomputer 82 may also be applied to a cassette interface 94 for interfacing to a cassette recorder 96 for recordation of data for subsequent use and retention.

Although only pressure and temperature transducers have been shown with the present gas well monitoring device 10, flow rate transducers for sensing the instantaneous flow rate of gas within the well head may also be used. This additional input parameter improves the accuracy of the bottom hole pressure calculations performed by microcomputer 82.

In operation of the present gas well monitoring device 10, transducers 42 and 60 and if necessary, a flow rate transducer for calculation of flowing bottom hole pressure are installed on christmas tree 26 for the particular well. Cable 28 is then interconnected to gas well monitoring device 10. Values for the well constants and calibration factors for the transducers are entered through keyboard 12 for storage in random access memory 86. The time and data sequence program is selected via time data sequence selector 90 and is stored in random access memory 86.

At times for which data acquisition is programmed via time-data sequence selector 90, the gas well monitoring device 10 will measure the values of pressure and temperature and calculate the value of bottom hole pressure that corresponds to these values. Values for well head temperature and pressure and bottom hole pressure are automatically entered into the data portion of random access memory 86 to complete the data acquisition sequence. The output of random access memory 86 may be applied to display 14, printer 15 or cassette interface 94 or alternatively to a floppy disk or other electromagnetic storage device as required.

It therefore can be seen that the present gas well monitoring device provides for a continuous calculation of bottom hole pressure from a gas well being monitored. The present monitoring device measures pressure and temperature at the well head to eliminate the need for placing devices in the well bore as utilized with previously designed gas well monitoring devices. As a result, the present monitoring system is inexpensive, compact and lightweight. The input of time of day and date at the initial time of programming of the present monitoring system permits for the output of data in real time format. Furthermore, the present monitoring device can be used with a variety of output devices for immediate display, "hard copy" display or electromagnetic storage.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A gas well monitoring device for installation at a well head for the determination of bottom hole pressure in a well bore comprising:
   a fixed sensing unit disposed at the well head and including pressure transducer means and temperature transducer means, said transducer means being exposed to the atmosphere of gas in the well head to thereby measure pressure and temperature of the gas at the well head;
   automatic control means for periodically sampling the output of said transducer means;
   processor means interconnected to said automatic control means for calculating the value of bottom hole pressure based upon the output of said transducer means;
   storage means interconnected to said processor means for receiving and storing at predetermined time intervals related values of the sampled well head pressure and well head temperature, and the calculated value of bottom hole pressure at said predetermined time intervals; and
   display means for displaying well data stored in said storage means including bottom hole pressure values.

2. The gas well monitoring device of claim 1 and further including:
   means for controlling the rate at which said automatic control means periodically samples the output of said transducer means.

3. The gas well monitoring device of claim 1 and further including:
   means for inputting well bore parameter data including impurity level data of the well bore to said processor means for use in calculating the value of bottom hole pressure.

4. The gas well monitoring device of claim 1 wherein said display means includes visual display means.

5. The gas well monitoring device of claim 1 wherein said display means includes printer means.

* * * * *